Figure 1:
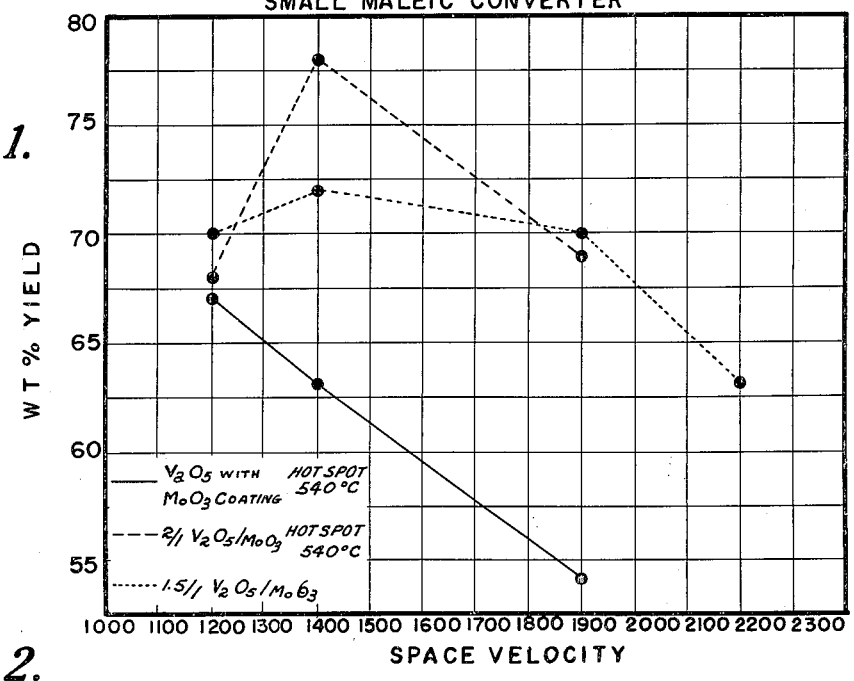

Oct. 24, 1961   J. A. DREIBELBIS   3,005,831

PREPARATION OF MALEIC ANHYDRIDES AND CATALYSTS THEREOF

Filed March 27, 1957

INVENTOR
JOHN A. DREIBELBIS

BY Cushman, Darby & Cushman
ATTORNEYS 3,005,831
PREPARATION OF MALEIC ANHYDRIDES AND CATALYSTS THEREOF
John A. Dreibelbis, Pittsburgh, Pa., assignor, by mesne assignments, to Pittsburgh Chemical Company, Pittsburgh, Pa., a corporation of Pennsylvania
Filed Mar. 27, 1957, Ser. No. 648,898
8 Claims. (Cl. 260—346.8)

This invention relates to oxidation catalysts and, more particularly, is concerned with catalysts for use in the vapor phase oxidation of organic compounds to form maleic anhydride or methyl maleic anhydride, said catalysts comprising vanadium pentoxide and molybdenum trioxide.

It is well known in the art to oxidize compounds such as benzene, toluene, xylene, butene, gasoline and the like in the vapor phase to maleic anhydride using a catalyst containing a mixture of vanadium pentoxide and molybdenum trioxide. Such prior art catalysts, however, have suffered from one or more of the following deficiencies:
(1) They do not have a sufficiently long catalytic life;
(2) They are not sufficiently durable; and
(3) They do not have a sufficiently high conversion efficiency.

Accordingly, it is an object of the present invention to prepare a $V_2O_5$-$MoO_3$ catalyst having a long life of catalytic activity, especially in the preparation of maleic anhydride from benzene and other hydrocarbons.

An additional object is to prepare a $V_2O_5$-$MoO_3$ catalyst of improved durability.

Another object is to prepare a $V_2O_5$-$MoO_3$ catalyst having a high conversion efficiency for converting hydrocarbons to maleic anhydride.

A further object is to devise an improved procedure for preparing maleic anhydride and its homologues.

Still another object is to devise an improved procedure for preparing $V_2O_5$-$MoO_3$ catalyst mixtures.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It is known to prepare an oxidation catalyst by coating discrete particles of an inert carrier base with an aqueous colloidal solution of vanadium pentoxide, e.g., see Cooper Patent, 2,510,803. The colloidal solution is prepared by fusing vanadium pentoxide and pouring the molten material into vigorously agitated water. Vanadium pentoxide is not a particularly effective catalyst, however, for forming maleic anhydride from a hydrocarbon.

Molybdenum trioxide has many properties similar to vanadium pentoxide, but it is not possible to satisfactorily form it into an aqueous colloidal solution in the manner just described due to the precipitation of the bulk of the oxide. All attempts to coat a carrier with a colloidal vanadium pentoxide solution together with a simple solution of molybdenum trioxide or other molybdenum compounds, e.g., ammonium molybdate, or with a simple solution of vanadium pentoxide simultaneously with a simple solution of molybdenum trioxide or other molybdenum compounds produced a catalyst which was defective in one or more of the following as a catalyst for forming dicarboxylic acid anhydrides, more especially maleic anhydride: namely, a relatively short catalyst life, poor adhering power to the carrier and low conversion efficiency.

It has now surprisingly been found that these disadvantages can be overcome by forming a colloidal solution of a mixture of vanadium pentoxide and molybdenum trioxide and then coating the colloidal solution on a carrier. This is accomplished by mixing the oxides, fusing the mixture and dispersing the fused mixture in water with vigorous agitation. The resulting colloidal solution is easily coated on the carrier to provide a catalyst coat that is durable, has long catalyst life, has a high conversion efficiency, e.g., in converting benzene to maleic anhydride, and results in an extremely intimate mixing of the vanadium pentoxide and molybdenum trioxide. Since molybdenum trioxide by itself will not form a satisfactory aqueous colloidal solution when employing this fusion technique, it is, indeed, unexpected that such outstanding results are obtained in using a mixture of this oxide with vanadium pentoxide.

Usually the oxides are mixed in the ratio of $V_2O_5$ to $MoO_3$ of from 10:1 to 1:1 by weight. Preferably, the ratio is from 4:1 to 1.5:1 with the most preferred ratio being 2:1.

The aqueous colloidal solution from which the catalyst mixture is applied to the carrier usually contains 0.1 to 5% of $V_2O_5$ and 0.1 to 1% of $MoO_3$ by weight.

The adherent coating of mixed catalysts is generally applied to the carrier simply by contacting the solid inert carrier particles with the aqueous colloidal solution and then evaporating the water from the colloidal solution while in contact with the carrier particles to thereby produce an adherent coating of the intimate mixture of $V_2O$ and $MoO_3$ on the carrier.

The coating of the carrier particles is preferably accomplished by contacting the particles with small successive portions of the colloidal solution and evaporating the water from the colloidal solution substantially as fast as the solution contacts the surface of the carrier particles. The quantity of each successive portion of colloidal solution which is contacted with the mass of carrier particles is controlled so that, at no time, are the carrier particles allowed to contact an accumulation of the solution contained upon the bottom of the vessel used for the coating operation. Other methods may be used for the coating operation, depending to some extent upon the particular carrier base used and the particular style of catalyst desired, but the process outlined above is particularly desirable because the evaporation of an excess amount of catalyst solution in the presence of insufficient carrier base has been found to cause ultimate coagulation and formation of a coating which is easily removed from the carrier.

Conventional relatively inert carriers can be used, such as finely divided alumina, refractory silica, pumice, silica gel, sand, quartz, Carborundum, aluminum, asbestos, kieselguhr, chamotte, fuller's earth, diatomaceous earth, Alundum, clay, etc. The particle size of the carrier base may be varied, e.g., from a fine powder to large lumps. Usually, uniformly sized particles of carrier base of about 2 to 20 mesh are employed.

As previously set forth, the catalysts of the present invention are particularly suitable for use in the oxidation of hydrocarbons and the like to maleic anhydride or methyl maleic anhydride. They can be used, for example, in preparing maleic anhydride from benzene, toluene, p-xylene, m-xylene, o-xylene, ethyl benzene, butene-1, butene-2, butane, butadiene, cyclohexane, gasoline, fluorene, anthracene, furane, furfural, etc., or in preparing methyl maleic anhydride from pentene-1, pentene-2, pentadiene-1, hexenes, hexadienes, etc. Preferably, the catalysts are used to prepare maleic anhydride from benzene.

As the oxidizing agent, there is normally employed air, oxygen, ozone or a mixture of oxygen with a gas inert under the reaction conditions. The preferred oxidizing agent is air. The oxidation reaction is carried out in the vapor phase, usually at a temperature of 400 to 600° C. and preferably at a temperature of about 540° C. While desirably the concentration of the benzene in the oxygen containing gas, e.g., air is about 0.5 to 1.5 mol percent, and preferably is about 0.6 mol percent, it is possible to employ an oxygen containing gas having as high as 90 mol percent of benzene or other hydrocarbon and as little as 7 mol percent oxygen, as is recognized in the art. The reaction can be carried out at atmospheric pressure, subatmospheric pressure or superatmospheric pressure. The time of contact with the catalyst is that conventionally used with mixed vanadium pentoxide-molybdenum trioxide catalysts, but usually is quite short, as is well recognized in the art. In the examples the term "space velocity" is employed and it is expressed in volumes of gas at standard temperature and pressure per volume of catalyst zone per hour.

Alundum, which is used as a carrier in the examples, is a highly porous fused aluminum oxide.

Figure 2:
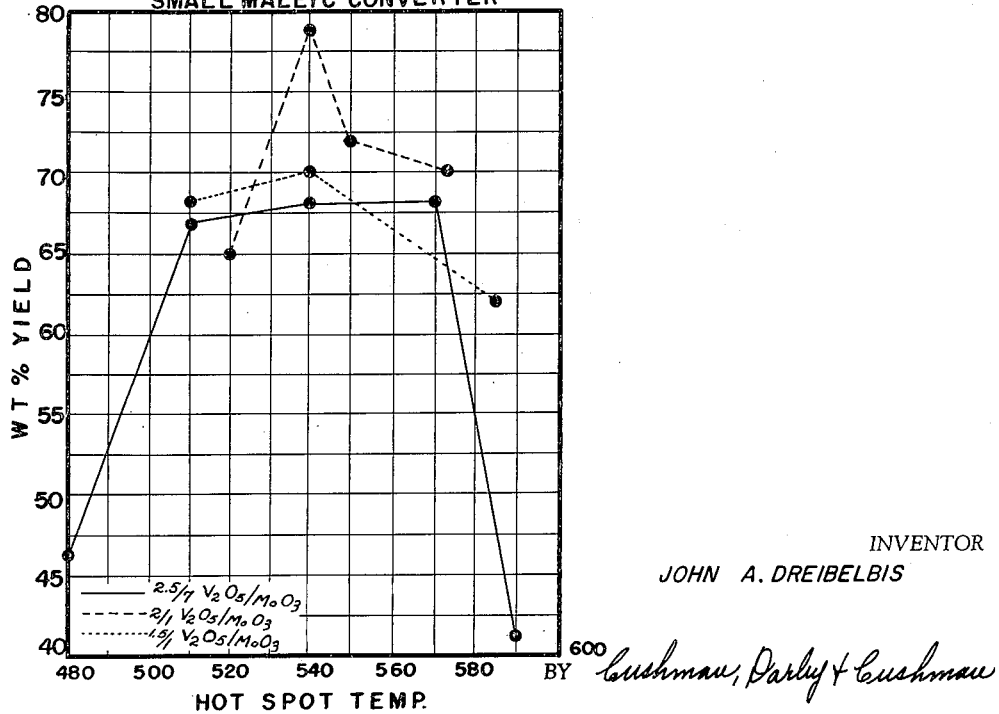

In the drawings:

FIGURE 1 is a graph showing the conversion of benzene to maleic anhydride at different space velocities at a constant temperature; and FIGURE 2 is a graph showing the effect of temperature on the yield of maleic anhydride from benzene.

Unless otherwise indicated, all percentages and parts in the specification and claims are by weight.

EXAMPLE 1

Into a 30 ml. silica crucible were charged 6 grams of $V_2O_5$ powder and 3 grams of $MoO_3$ powder. After thorough mixing of the oxides, the crucible was heated with a gas flame until the material fused and became cherry red (850° C.). At this point the molten mixture was poured into 600 ml. of distilled water while vigorous agitiation was carried out with a mechanical stirrer. Stirring was continued for 15 minutes after dispersion in the water.

This procedure was repeated as another 6 grams of $V_2O_5$ and 3 grams of $MoO_3$ were fused and dispersed in the 600 ml. of distilled water. There was thus produced an aqueous colloidal solution containing 2% $V_2O_5$ and 1% $MoO_3$.

200 grams of 4 to 8 mesh Alundum was charged into a 600 ml. stainless steel beaker. The beaker was fitted so that it could be rotated on its axis while held at a 45° angle. The speed of rotation was about 10 to 12 r.p.m. The rotation of the beaker caused continuous tumbling and mixing of the Alundum carrier. The beaker and its contents were heated from beneath by a gas flame. When the temperature of the Alundum carrier was about 150° C., the colloidal solution was slowly dropped upon it. The heat of the carrier flashed off the water of the colloidal solution immediately leaving a coating of the $V_2O_5$-$MoO_3$ clinging tightly to the carrier. In this manner, the 600 ml. of colloidal solution was added to produce a finished catalyst on carrier which was about 4.4% $V_2O_5$ and 2.2% $MoO_3$. This example illustrated the preferred ration of $V_2O_5$ to $MoO_3$ for oxidation of benzene to maleic anhydride.

In the above example, either alumina or silica can be substituted for the Alundum with equally satisfactory results. The water can be removed from the colloidal solution effectively by any of the methods disclosed in the Cooper patent, although the method described in the present example is preferred.

EXAMPLE 2

Into a 30 ml. silica crucible were charged 8 grams of $V_2O_5$ powder and 2 grams of $MoO_3$ powder. The mixture was fused as in Example 1 and then poured into 600 ml. of distilled water with vigorous agitation and stirring continued for 15 minutes.

This procedure was repeated as another 8 grams of $V_2O_5$ and 2 grams of $MoO_3$ were fused and dispersed in the distilled water. There was thus produced an aqueous colloidal solution containing 2.6% $V_2O_5$ and 0.6% $MoO_3$.

200 grams of 4 to 8 mesh Alundum were then coated exactly as described in Example 1. The catalyst produced had 5.6% $V_2O_5$ and 1.4% $MoO_3$ on the Alundum carrier.

EXAMPLE 3

Example 2 was repeated using 4.5 grams of powdered $V_2O_5$ and 3 grams of powdered $MoO_3$ in each of the first and second fusion steps. The aqueous colloidal solution contained 1.5% $V_2O_5$ and 1% $MoO_3$. The finished product contained 3.3% $V_2O_5$ and 2.2% $MoO_3$ on the Alundum carrier.

EXAMPLE 4

Example 2 was repeated using 4 grams of powdered $V_2O_5$ and 4 grams of powdered $MoO_3$ in each of the first and second fusion steps. The aqueous colloidal solution contained 1.3% $V_2O_5$ and 1.3% $MoO_3$. The finished product contained 2.9% $V_2O_5$ and 2.9% $MoO_3$ on the Alundum carrier.

EXAMPLE 5

Example 2 was repeated using 9 grams of $V_2O_5$ powder and 0.9 gram of $MoO_3$ powder in each of the first and second fusion steps. The aqueous colloidal solution contained 3.0% $V_2O_5$ and 0.3% $MoO_3$. The finished product contained 6.4% $V_2O_5$ and 0.7% $MoO_3$ on the Alundum carrier.

In preparing maleic anhydride from benzene, toluene, etc. utilizing the novel catalysts of the instant invention there was employed a converter system consisting of a vaporizer, converter and condenser. In the vaporizer the primary air was bubbled through the benzene and carried it in vapor form to join the secondary air. The resulting mixture then went to the converter which was a 15 mm. glass tube about 20 inches long located inside a larger tube which served as a heating jacket and as insulation. About 18 inches of the converter was filled with a charge of 100 ml. of 4 to 8 mesh catalyst ($V_2O_5$-$MoO_3$ on an Alundum carrier). As the gas stream containing air and benzene vapor passed through the catalyst, the oxidation took place. The reaction mixture then passed into the condenser as air, maleic anhydride vapor, water vapor and sometimes included unreacted benzene. Most of the maleic anhydride dropped out in the condenser; the remaining gas passed through the water scrubber and was released. (For most efficient operation, additional maleic anhydride can be recovered from the scrubber and the benzene, if present in the exit gases, recycled to the vaporizer.) The benzene charged to the vaporizer was of known weight, usually 2 grams. The material in the condenser was washed out with a mixture of acetone and water and then added to the scrubber water. The weight of maleic anhydride was calculated from a titration of this latter solution with 0.1N NaOH. From these weights the weight percent yield was calculated.

In large scale operation, the maleic anhydride in the condenser can be removed by heating the jacket of the condenser with steam and allowing the maleic anhydride to melt and run down to a suitable reservoir.

Because of the high vapor pressure of benzene the volume of primary or vaporizing air required was very small, e.g., only about 3% of the total air. The hot spot in the reaction zone was normally ⅓ to ½ of the length of the catalyst bed away from the end of the converter where the gas stream entered.

The results obtained in converting benzene to maleic anhydride with the catalysts of the present invention in comparison to $V_2O_5$ and $V_2O_5$-$MoO_3$ catalysts prepared by other procedures are given in Table I.

Table I

| Catalyst | Best Wt. Percent Yield | Runs Before Drop in Efficiency |
|---|---|---|
| a. 4:1 $V_2O_5$-$MoO_3$ (made by Example 2) | 63 | No drop off in efficiency. |
| b. 2:1 $V_2O_5$-$MoO_3$ (made by Example 1) | 80 | Do. |
| c. 1.5:1 $V_2O_5$-$MoO_3$ (made by Example 3) | 75 | Do. |
| d. 2.5:7 $V_2O_5$-$MoO_3$ (ammonium molybdate). | 72 | 6. |
| e. 4:7 $V_2O_5$-$MoO_3$ (ammonium molybdate). | 70 | 3. |
| f. $V_2O_5$ coated with $MoO_3$ | 67 | Coating flaked badly. |
| g. $V_2O_5$ | 49 | No drop off in efficiency. |

Catalysts $d$ and $e$ were prepared by simultaneously dropping a $V_2O_5$ aqueous colloidal solution and an ammonium molybdate solution simultaneously on 4 to 8 mesh Alundum carrier in a heated revolving coater. Catalyst $f$ was prepared by coating a $V_2O_5$ colloidal solution on 4 to 8 mesh Alundum carrier prepared in the manner described in the Cooper patent with a solution of ammonium molybdate and removing the water as just described. Catalyst $g$ was prepared as described in the Cooper patent using a 4 to 8 mesh Alundum carrier.

FIGURE 1 of the drawings compares catalysts $b$, $c$ and $f$ of Table I in the yield of maleic anhydride from benzene at various space velocities at 540° C., which is the preferred reaction temperature. It can be seen from FIGURE 1 that not only is the maximum yield obtainable better for catalysts $b$ and $c$ which are within the present invention in contrast to catalyst $f$ which is outside the scope of the invention, but also it is possible to obtain better yields with the catalysts of the present invention even at greatly increased space velocities. This is of importance since the greater the space velocity, the greater the volume of benzene that can be treated with a given amount of catalyst in any unit of time.

FIGURE 2 illustrates the fact that the preferred temperature is 540° C. for converting benzene to maleic anhydride. The catalysts used in connection with FIGURE 2 are those identified as $b$, $c$ and $d$ in Table I. The space velocity of the runs in FIGURE 2 was 1400. FIGURE 2 also illustrates the fact that a $V_2O_5$-$MoO_3$ ratio of 2:1 gives the maximum yield of maleic anhydride.

Benzene was converted to maleic anhydride using the converter previously described. In each case 100 ml. of 4 to 8 mesh Alundum was the carrier. The benzene was vaporized with air to give a mol percent concentration as indicated in Table II.

Table II

| Catalyst Ratio, $V_2O_5$:$MoO_3$ | Temperature | Benzene Concentration, mol percent | Space velocity | Grams maleic anhydride per 100 grams benzene input |
|---|---|---|---|---|
| 2:1 | 510 | 1.0 | 1,200 | 65 |
| 2:1 | 540 | 0.6 | 1,400 | 80 |
| 2:1 | 540 | 0.7 | 1,900 | 76 |
| 2:1 | 575 | 0.6 | 1,900 | 70 |
| 2:1 | 570 | 1.3 | 2,200 | 62 |
| $V_2O_5$ (all) (g) | 585 | 0.8 | 1,200 | 47 |
| $V_2O_5$ (all) (g) | 570 | 1.6 | 1,200 | 48 |
| $V_2O_5$ (all) (g) | 550 | 0.9 | 1,400 | 30 |
| 2.5:7 (d) | 510 | 1.4 | 1,200 | 66 |
| 2.5:7 (d) | 560 | 0.6 | 1,200 | 57 |
| 2.5:7 (d) | 570 | 1.4 | 1,200 | 70 |
| 2.5:7 (d) | 500 | 0.8 | 1,400 | 55 |
| 2.5:7 (d) | 570 | 1.1 | 2,200 | 33 |
| 4:7 (e) | 530 | 1.4 | 1,200 | 68 |
| 4:7 (e) | 550 | 1.4 | 1,200 | 58 |
| 1:2 (f) | 520 | 1.5 | 1,200 | 41 |
| 1:2 (f) | 540 | 1.5 | 1,200 | 49 |
| 1:2 (f) | 550 | 0.6 | 1,200 | 67 |
| 1:2 (f) | 540 | 0.5 | 1,400 | 65 |
| 1:2 (f) | 540 | 0.5 | 1,900 | 54 |

In Table II the catalyst with a 2:1 $V_2O_5$-$MoO_3$ ratio was that prepared by Example 1. The other catalysts, namely, $d$, $e$, $f$ and $g$ were those employed in Table I and the method of preparation of these catalysts is shown in connection with that table. Catalysts $d$, $e$, $f$ and $g$ are outside the scope of the instant invention and they are included in Table II for comparison only. It should also be noted that there was no drop off in yields of maleic anhydride after 12 runs with the 2:1 $V_2O_5$-$MoO_3$ catalyst and the catalyst was in good condition. Catalyst $d$ had a drop in yield after 6 runs, while catalyst $e$ had a drop in yields after only 3 runs. Catalyst $f$ flaked off badly and was undesirable for this reason.

I claim:

1. A process of preparing a catalyst comprising fusing a mixture of $V_2O_5$ and $MoO_3$, wherein the ratio of $V_2O_5$ to $MoO_3$ is from 10:1 to 1:1, pouring said fused mixture into water with agitation to form an aqueous colloidal solution of a mixture of $V_2O_5$ and $MoO_3$, contacting solid, inert, carrier particles with said aqueous colloidal solution and evaporating the water from the colloidal solution while in contact with the carrier particles to thereby produce an adherent coating of said mixture of $V_2O_5$ and $MoO_3$ on said carrier.

2. A catalyst according to claim 1 wherein the ratio of $V_2O_5$ to $MoO_3$ is from 4:1 to 1.5:1.

3. A catalyst according to claim 2 wherein the ratio of $V_2O_5$ to $MoO_3$ is 2:1.

4. A catalyst according to claim 1 wherein the aqueous colloidal solution from which the catalyst is made contains 0.1 to 5% $V_2O_5$.

5. In the vapor phase catalytic partial oxidation process for the manufacture of a dicarboxylic acid anhydride from the group consisting of maleic anhydride and methyl maleic anhydride, the improvement comprising conducting the oxidation in contact with a catalyst comprising solid inert carrier particles having an adherent coating of an intimate mixture of vanadium pentoxide and molybdenum trioxide thereon produced by coating said inert carrier particles with a firmly adherent coating of an intimate mixture of vanadium pentoxide and molybdenum trioxide by contacting the carrier particles with an aqueous solution containing colloidal vanadium pentoxide and colloidal molybdenum trioxide prepared by fusing a mixture of $V_2O_5$ and $MoO_3$ wherein the ratio of $V_2O_5$ to $MoO_3$ is from 10:1 to 1:1, pouring said fused mixture into water with agitation to prepare said aqueous colloidal solution and evaporating the water from the colloidal solution while in contact with the carrier particles.

6. A process for making maleic anhydride which comprises passing a mixture of benzene and an oxygen containing gas into contact with a catalyst at a temperature of 400 to 600° C., said catalyst consisting of solid, inert refractory carrier particles having an adherent coating of an intimate mixture of $V_2O_5$ and $MoO_3$ thereon produced by coating said inert carrier particles with a firmly adherent coating of an intimate mixture of $V_2O_5$ and $MoO_3$ by contacting the carrier particles with an aqueous solution containing significant amounts of both colloidal $V_2O_5$ and colloidal $MoO_3$ in the ratio of $V_2O_5$ to $MoO_3$ from 10:1 to 1:1, said aqueous solution having been prepared by fusing a mixture of $V_2O_5$ and $MoO_3$ in the stated proportions and pouring said fused mixture into water with agitation, and evaporating the water from the colloidal solution while in contact with the carrier particles.

7. A process according to claim 6 wherein the ratio of $V_2O_5$ to $MoO_3$ is 2:1.

8. A process according to claim 7 wherein the temperature of the reaction between the benzene and the oxygen containing gas is about 540° C., the oxygen containing gas is air and the concentration of benzene is about 0.6 mol percent.

(References on following page)

References Cited in the file of this patent

UNITED STATES PATENTS

| | | |
|---|---|---|
| 1,895,522 | Punnett | Jan. 31, 1933 |
| 2,206,377 | Weiss | July 2, 1940 |
| 2,294,130 | Porter | Aug. 25, 1942 |
| 2,510,803 | Cooper | June 6, 1950 |
| 2,777,860 | Egbert | Jan. 15, 1957 |
| 2,785,141 | Fleck | Mar. 12, 1957 |
| 2,846,450 | Bloch | Aug. 5, 1958 |

FOREIGN PATENTS

| | | |
|---|---|---|
| 701,707 | Great Britain | Dec. 30, 1953 |